United States Patent
Syed et al.

(10) Patent No.: US 9,337,878 B2
(45) Date of Patent: May 10, 2016

(54) DUAL WATCH RADIO FREQUENCY RECEIVER

(71) Applicant: MOTOROLA SOLUTIONS, INC, Schaumburg, IL (US)

(72) Inventors: Shafiullah Syed, Parkland, FL (US); John R. Melton, Coral Springs, FL (US); Jiun How Ng, Puchong (MY)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 269 days.

(21) Appl. No.: 14/107,336

(22) Filed: Dec. 16, 2013

(65) Prior Publication Data

US 2015/0171907 A1 Jun. 18, 2015

(51) Int. Cl.
*H04B 1/12* (2006.01)
*H04W 4/22* (2009.01)
*H04W 88/06* (2009.01)
*H04B 7/08* (2006.01)
*H04W 52/02* (2009.01)
*H04B 1/16* (2006.01)

(52) U.S. Cl.
CPC .............. *H04B 1/126* (2013.01); *H04B 7/082* (2013.01); *H04B 7/0817* (2013.01); *H04B 7/0837* (2013.01); *H04B 7/0871* (2013.01); *H04W 4/22* (2013.01); *H04W 52/02* (2013.01); *H04W 88/06* (2013.01); *H04B 1/16* (2013.01)

(58) Field of Classification Search
CPC .......... H04B 1/00; H04B 1/126; H04B 1/406; H04B 7/0837; H04B 7/0874; H04B 1/16; H04B 4/22; H04B 7/0817; H04B 7/082; H04W 52/0229; H04W 88/06
See application file for complete search history.

(56) References Cited

U.S. PATENT DOCUMENTS

| | | | |
|---|---|---|---|
| 5,303,411 A | 4/1994 | Stengel et al. | |
| 5,710,995 A * | 1/1998 | Akaiwa | H04B 7/0874 375/347 |
| 5,758,266 A | 5/1998 | Kornfeld et al. | |
| 5,819,167 A | 10/1998 | Lawrence | |
| 5,995,815 A | 11/1999 | Blom | |
| 6,535,748 B1 | 3/2003 | Vuorio et al. | |
| 7,212,057 B2 | 5/2007 | Gomm et al | |
| 7,398,067 B2 | 7/2008 | Wolf | |
| 7,409,159 B2 | 8/2008 | Izadpanah | |

(Continued)

FOREIGN PATENT DOCUMENTS

| | | |
|---|---|---|
| EP | 0945998 A2 | 9/1999 |
| WO | 2004047309 A2 | 6/2004 |
| WO | 2012126512 A1 | 9/2012 |
| WO | 2013003820 A1 | 1/2013 |

OTHER PUBLICATIONS

Corresponding PCT Application No. PCT/US2014/069218—International search Report with Written Opinion mailed Mar. 6, 2015.

*Primary Examiner* — Thanh Le

(74) *Attorney, Agent, or Firm* — Steven A. May; Barbara R. Doutre

(57) ABSTRACT

A dual watch receiver is provided that, when operating in a single watch mode, receives a radio frequency (RF) signal, determines a signal quality metric associated with a received RF signal, and based on the determined signal quality metric, determines whether to route a same RF signal to only a first receiver path or to both of the first receiver path and a second receiver path, wherein the first receiver path and second receiver path process a received RF signal in parallel.

12 Claims, 5 Drawing Sheets

(56) References Cited

U.S. PATENT DOCUMENTS

| | | | |
|---|---|---|---|
| 7,885,621 B2* | 2/2011 | Tsukio | H04W 52/0229 375/347 |
| 8,064,958 B2 | 11/2011 | Skarby et al. | |
| 8,378,886 B2 | 2/2013 | Farrokhi et al. | |
| 8,503,958 B2 | 8/2013 | Carrera et al. | |
| 2004/0106441 A1* | 6/2004 | Kazakevich | H04B 7/0837 455/574 |
| 2007/0207751 A1* | 9/2007 | Behzad | H04B 1/406 455/132 |
| 2010/0210272 A1 | 8/2010 | Sundstrom et al. | |
| 2012/0327825 A1 | 12/2012 | Gudem et al. | |
| 2013/0156134 A1 | 6/2013 | Galan et al. | |
| 2013/0308483 A1 | 11/2013 | Jalloul et al. | |

* cited by examiner

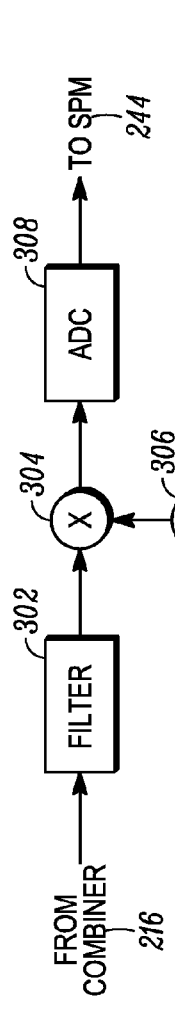
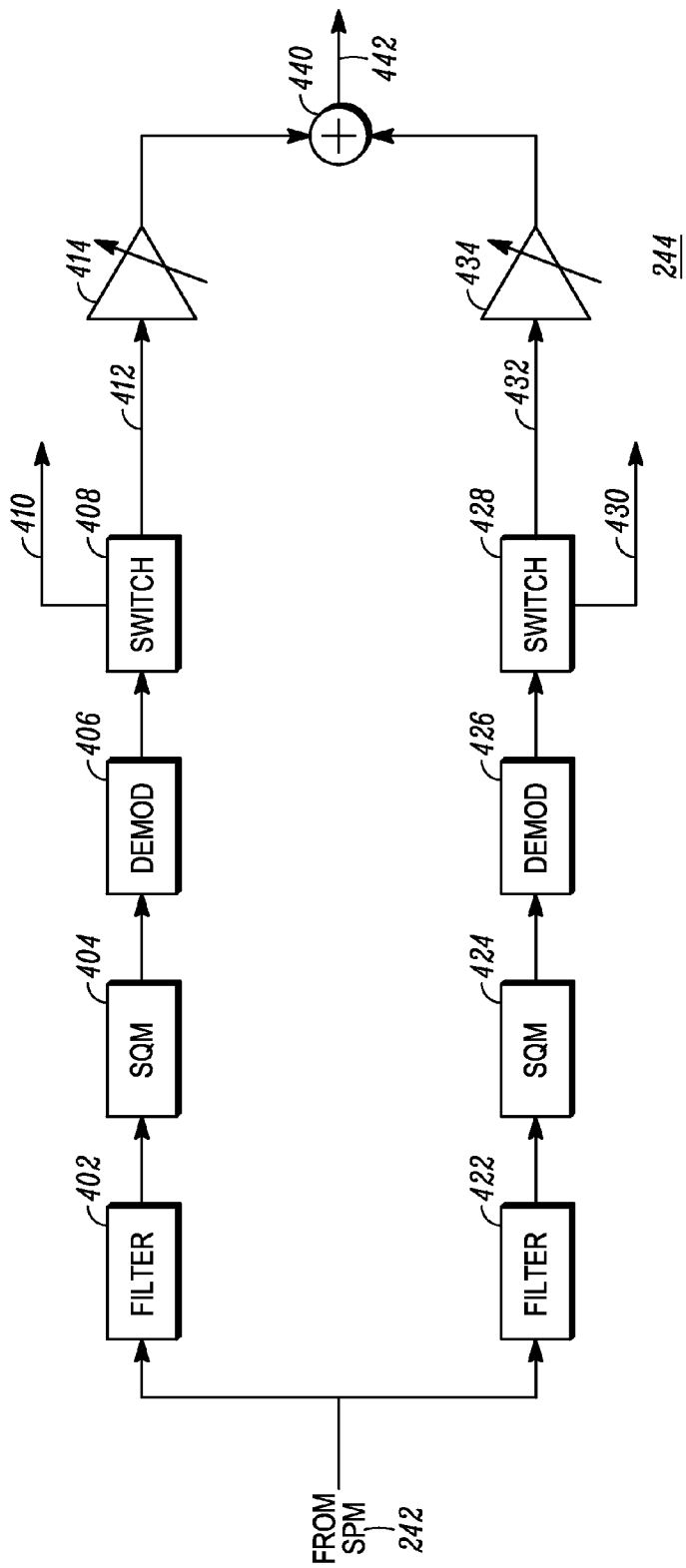
FIG. 3
FIG. 4

DUAL WATCH RADIO FREQUENCY RECEIVER

FIELD OF THE INVENTION

The present invention relates generally to radio frequency (RF) communication systems, and in particular to operation of a dual watch receiver in an RF communication device.

BACKGROUND OF THE INVENTION

Public Safety communication systems employ land mobile radios (LMRs) having dual watch receivers. Dual watch receivers may operate in single watch mode or dual watch mode. More particularly, dual watch receivers have two receiver paths. When operating in dual watch mode, the dual watch receiver uses both receiver paths, receiving traffic intended for the LMR via a first channel and a first receiver path while simultaneously scanning for signals in other channels using a second receiver path. When operating in a single watch mode, the dual watch receiver is receiving signals solely on one of the receiver paths while the other receiver path is disabled.

A sensitivity of a receiver is a critical specification of a radio, such as an LMR, that determines the lowest detectable signal level of the radio's receiver. Emergency situations may arise where public safety personnel, such as a firefighter, may be inside of a building where reception is poor due to obstructions and/or a noisy environment and the dual watch receiver of the LMR is operating close to the receiver's sensitivity. It may be critical, in such situations, that the LMR not lose contact with the public safety communication system.

BRIEF DESCRIPTION OF THE DRAWINGS

FIG. 3 is a block diagram of a first signal processing module of the receiver of FIG. 2 according to an embodiment of the present invention.

FIG. 4 is a block diagram of a second signal processing module of the receiver of FIG. 2 according to an embodiment of the present invention.

Figure 1:
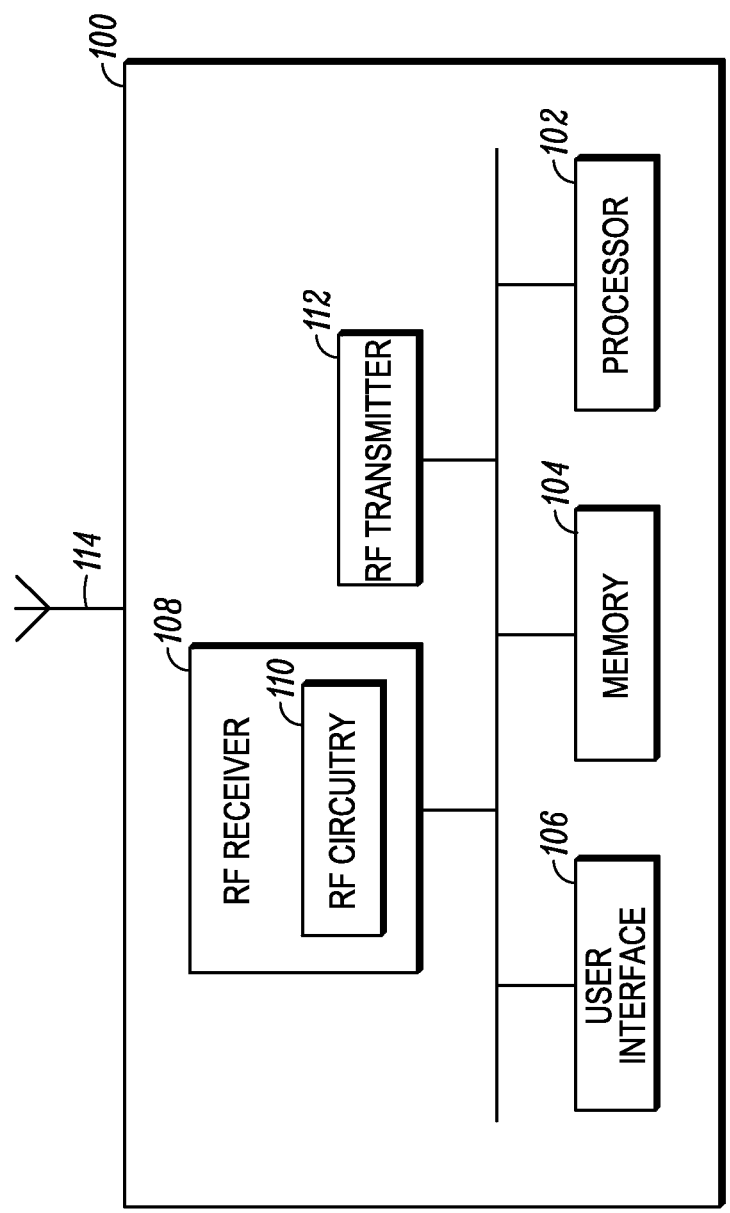
FIG. 1 is a block diagram of a wireless communication device in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for improved signal reception by a dual watch receiver in emergency situations where public safety personnel, such as a firefighter, may be inside of a building where reception is poor due to obstructions and/or a noisy environment, and where the dual watch receiver is operating close to the receiver's sensitivity, a dual watch receiver is provided that, when operating in a single watch mode, receives a radio frequency (RF) signal, determines a signal quality metric associated with a received RF signal, and based on the determined signal quality metric, determines whether to route a same RF signal to only a first receiver path or to both of the first receiver path and a second receiver path, wherein the first receiver path and second receiver path process a received RF signal in parallel. Thus, when operating in a single watch mode, the dual watch receiver may employ both receiver paths to provide improved signal reception when operating conditions are poor but, when operating conditions are good, the receiver continues to utilize only a single receiver path, thereby minimizing power consumption and extending battery life.

Generally, an embodiment of the present invention encompasses an RF receiver capable of operating in single watch mode and dual watch mode. The RF receiver includes a low noise amplifier (LNA) that is configured to amplify a received RF signal, a first receiver path coupled to the LNA, wherein the first receiver path comprises a first mixer that is configured to downconvert an RF signal received from the LNA to a first intermediate frequency (IF) to produce a first IF signal, and a second receiver path coupled to the LNA, wherein the second receiver path comprises a second mixer that is configured to downconvert an RF signal received from the LNA to a second IF to produce a second IF signal, wherein the second IF is different from the first IF, and wherein the first receiver path and second receiver path process a received RF signal in parallel. The RF receiver further includes a processor coupled to each of the first receiver path and the second receiver path, wherein the processor is configured to, when operating in single watch mode, determine a signal quality metric associated with a received RF signal and, based on the determined signal quality metric, determine whether to route an amplified version of a same RF signal to only one of the first receiver path and the second receiver path or to route amplified versions of a same RF signal to both the first receiver path and the second receiver path.

Another embodiment of the present invention encompasses a method for receiving an RF signal by a dual watch receiver when operating in a single watch mode. The method includes determining a signal quality metric associated with a received RF signal and, based on the determined signal quality metric, determining whether to route a same RF signal to only a first receiver path or to both of the first receiver path and a second receiver path, wherein the first receiver path and second receiver path process a received RF signal in parallel.

Yet another embodiment of the present invention encompasses a wireless communication device. The wireless communication device includes an RF transmitter, a dual watch RF receiver, and a processor. The dual watch RF receiver includes a low noise amplifier (LNA) that is configured to amplify a received RF signal, a first receiver path coupled to the LNA, wherein the first receiver path comprises a first mixer that is configured to downconvert an RF signal received from the LNA to a first intermediate frequency (IF) to produce a first IF signal, and a second receiver path coupled to the LNA, wherein the second receiver path comprises a second mixer that is configured to downconvert an RF signal received from the LNA to a second IF to produce a second IF signal, wherein the second IF is different from the first IF, and wherein the first receiver path and second receiver path process a received RF signal in parallel. The processor is configured to, when operating in single watch mode, determine a signal quality metric associated with a received RF signal and, based on the determined signal quality metric, determine whether to route an amplified version of a same RF signal to only one of the first receiver path and the second receiver path or to route amplified versions of a same RF signal to both the first receiver path and the second receiver path.

The present invention may be more fully described with reference to FIGS. 1-5B. FIG. 1 is a block diagram of a wireless communication device 100 in accordance with an embodiment of the present invention. Wireless communication device 100 includes a processor 102, such as one or more microprocessors, microcontrollers, digital signal processors (DSPs), combinations thereof or such other devices known to those having ordinary skill in the art. Wireless communication device 100 further includes at least one memory device 104 associated with processor 102, such as random access memory (RAM), dynamic random access memory (DRAM), and/or read only memory (ROM) or equivalents thereof, that maintain data and programs that may be executed by the processor and that allow the wireless communication device to perform all functions necessary to operate in a wireless communication system.

Wireless communication device 100 further includes a user interface 106, a radio frequency (RF) receiver 108, and an RF transmitter 112 that each are coupled to processor 102 and to an antenna 114. User interface 106 provides a user of the MS with the capability of interacting with the MS, including inputting instructions into the MS. User interface 106 may include a display screen and a keypad that includes multiple keys that may be used by a user of the MS to input instructions into the MS, including a group call key, such as a Push-to-Talk (PTT) key, that may be used to input an instruction to initiate, and to reserve a floor of, a group call. The display screen may comprise a touch screen that is able to determine a position (i.e., an X-coordinate and a Y-coordinate) of a user's touch on the touch screen and convey the position data to processor 102. Based on the position data, processor 102 then translates the user's touch into an instruction. User interface 106 further includes a microphone and associated audio input circuitry (not shown) for receiving audio input from the user of wireless communication device 100 and a speaker and associated audio output circuitry (not shown) for playing out audio to the user of wireless communication device 100. Receiver 108 includes RF circuitry 110 for receiving RF signals via an air interface, amplifying the received signals, and downconverting the received signals, for example, to an intermediate frequency (IF) and/or a baseband frequency, for further processing by processor 102.

Figure 2:
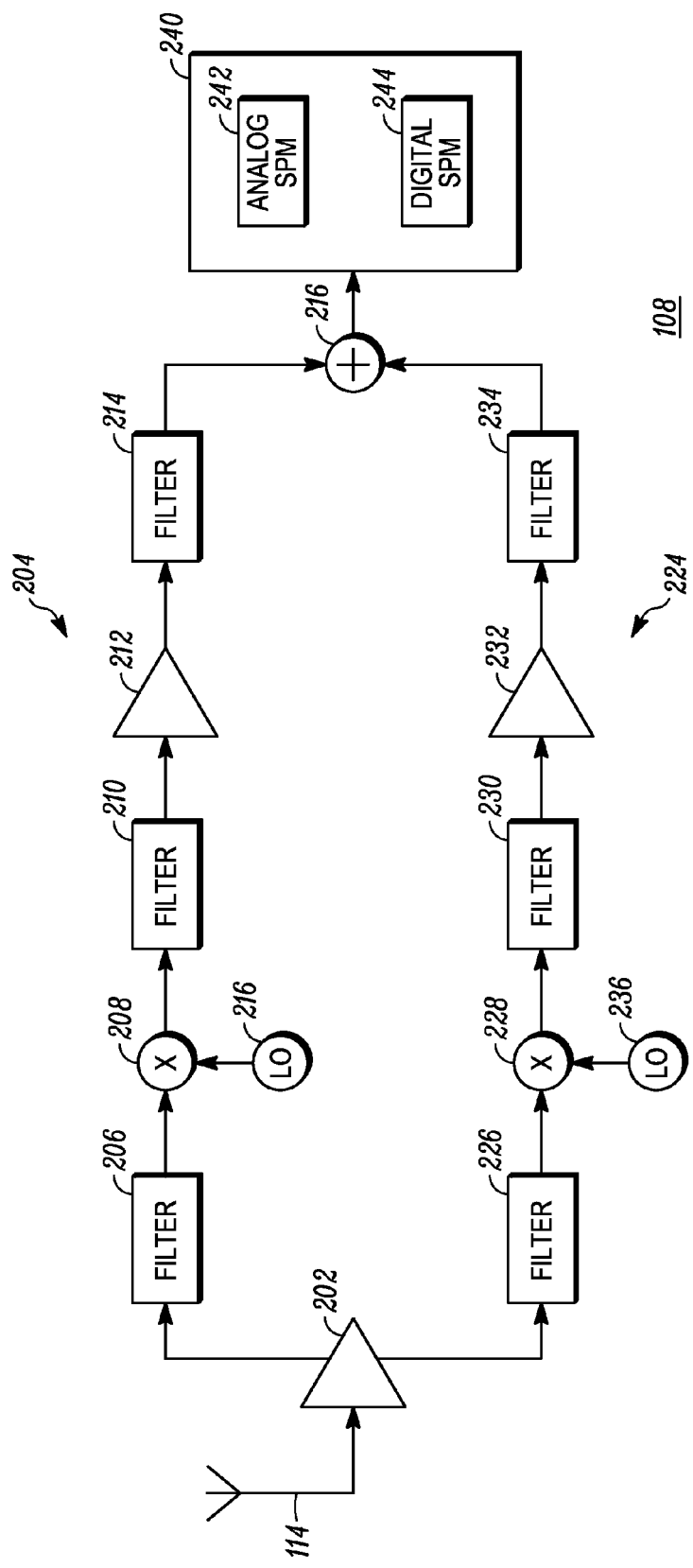
FIG. 2 is a block diagram of a receiver of the wireless communication device of FIG. 1 in accordance with an embodiment of the present invention.

Referring now to FIG. 2, a block diagram is provided illustrating receiver 108 in accordance with an embodiment of the present invention. While FIG. 2 depicts a dual mode receiver with two parallel receiver paths, FIG. 2 is provided merely to illustrate an operation of the present invention and is not intended to limit the invention with respect to the type of receivers in which the present invention may be employed.

Receiver 108 includes two parallel receiver paths 204, 224, that is, a first receiver path 204 and a second receiver path 224, that each are implemented in RF circuitry 110 and that each are coupled to antenna 114 via a low noise amplifier (LNA) 202. In various embodiments of the present invention, the LNA may be a dual output LNA, for example, as described in U.S. patent application Ser. No. 14/107135, assigned to the same assignee as this application and filed on the same date as this application and hereby incorporated by reference herein, or the LNA may be followed by a passive splitter that splits the amplified signal to each of first receiver path 204 and second receiver path 224. In still other embodiments of the present invention, wireless communication device 100 may include multiple LNAs coupled to antenna 114 via an intervening splitter, wherein first receiver path 204 may be coupled to the antenna via the splitter and a first LNA and second receiver path 224 may be coupled to the antenna via the splitter and a second LNA.

First receiver path 204 comprises a first RF filter 206 coupled to a first output port of LNA 202, a first mixer 208 coupled to the first RF filter, a first intermediate frequency (IF) filter 210 coupled to the first mixer, a first IF amplifier 212 coupled to the first IF filter, and a second IF filter 214 coupled to the first IF amplifier and to a signal combiner 216. First mixer 208 is coupled to a first reference signal source 216, preferably a voltage controlled oscillator (VCO), that provides a first reference signal at a first reference signal frequency, $f_{ref\_1}$, to first mixer 208 such that the first mixer downconverts a RF signal received from first RF filter 206 to a first intermediate frequency $f_{IF\_1}$, where $f_{RF\_1}$ is a carrier frequency of the RF signal received from first RF filter 206 and where $f_{IF\_1}=f_{RF\_1}+f_{ref\_1}$ or $f_{RF\_1}-f_{ref\_1}$. Second receiver path 224 includes a second RF filter 226 coupled to a second output port of LNA 202, a second mixer 228 coupled to the second RF filter, a third IF filter 230 coupled to the second mixer, a second IF amplifier 232 coupled to the third IF filter, and a fourth IF filter 234 coupled to the second IF amplifier and to signal combiner 216. Second mixer 228 is coupled to a second reference signal source 236, preferably a voltage controlled oscillator (VCO), that provides a second reference signal at a second reference signal frequency, $f_{ref\_2}$, to second mixer 228 such that the second mixer downconverts a RF signal received from second RF filter 226 to a second intermediate frequency $f_{IF\_2}$, where $f_{RF\_2}$ is a carrier frequency of the RF signal received from second RF filter 226 and where $f_{IF\_2}=f_{RF\_2}+f_{ref\_2}$ or $f_{RF\_2}=f_{ref\_2}$.

Receiver 108 additionally includes a signal processing unit 240 that processes signals received from each of first receiver path 204 and second receiver path 224. In an exemplary embodiment, signal processing unit 240 may include a first, analog signal processing module (SPM) 242 and a second, digital SPM 244. In various embodiments of the present invention, first SPM 240 and second SPM 244 may be the same or separate signal processing modules and one or more of SPM 240 and SPM 244 may be implemented by processor 102; however, one of ordinary skill in the art realizes that analog SPM 242 may be implemented in RF circuitry 1I 0 and/or one or both of SPM 242 and SPM 244 may be implemented in integrated circuits (ICs), application specific integrated circuits (ASICs), field programmable gate arrays (FPGAs), and the like, such as ASICs implemented in wireless communication device 100. Based on the present disclosure, one skilled in the art will be readily capable of producing and implementing such software and/or hardware without undo experimentation.

Receiver 108 operates to provide improved signal reception over RF receivers of the prior art when wireless communication device 100 is operating in single watch mode. In order to understand the operation of wireless communication device 100 and Receiver 108, an overview of the operation of Receiver 108 when operating in dual watch mode is first described.

When operating in dual watch mode, wireless communication device 100 receives multiple radio frequency (RF) signals at antenna 114 and mutes the multiple RF signals to receiver 108, where the multiple RF signals are routed to LNA 202 via a fixed filter (not shown), that is, a preselector. The fixed filter is designed to pass signals in a particular frequency band, such as the Very High Frequency (VHF) band, the Ultra High Frequency (UHF) band, or the 700/800 MHz band, and filter out signals of other bands. LNA 202 then amplifies the filtered RF signal and routes the amplified RF signal to each of first receiver path 204, via the first output port of the LNA, and second receiver path 224, via the second output port of the LNA.

First receiver path 204 routes the amplified RF signals, received from LNA 202, to first RF filter 206, preferably a band pass filter designed to pass signals in a first RF frequency band centered at a first RF frequency, $f_{RF1}$. First RF filter 206 filters out-of-band noise and routes the filtered and amplified multiple RF signals to first mixer 208. Mixer 208 downconverts the multiple RF signals to produce a first multiple IF signals, wherein a first desired RF signal, $RF_1$, of the multiple RF signals is downconverted to a first predetermined IF, that is, $f_{IF1}$, to produce a first IF signal. $IF_1$ and wherein the other RF signals, also downconverted to an IF, are correspondingly offset in frequency. Mixer 208 then routes first multiple IF signals to first IF filter 210. First IF filter 210, preferably a band pass filter centered at the first IF frequency, $f_{IF1}$, filters out-of-band signals, such as non-desired RF signals that now are offset, in frequency, from $IF_1$, and any out-of-band images generated by mixer 208, such that only the first desired RF signal, as downconverted to $f_{IF1}$, remains, that is, $IF_1$. First IF filter 210 then routes the filtered first IF signal, that is, $IF_1$, to first IF amplifier 212. IF amplifier 212 amplifies the filtered first IF signal to produced an amplified first IF signal, and routes the amplified first IF signal to second IF filter 214, preferably a band pass filter also centered at the first IF frequency, $f_{IF1}$. Second IF filter 214 filters out-of-band noise, for example, noise generated by amplifier 212, from the amplified first IF signal to produce a filtered amplified first IF signal and then routes the filtered amplified first IF signal to signal combiner 216.

Second receiver path 224 routes the amplified RF signals received from LNA 202 to second RF filter 226, preferably a band pass filter designed to pass signals in a second RF frequency band centered at a second RF frequency, $f_{RF2}$. Second RF filter 226 filters out-of-band noise and mutes the filtered and amplified multiple RF signals to second mixer 228. Mixer 228 downconverts the multiple RF signals to produce a second multiple IF signals, wherein a second desired RF signal, $RF_2$, of the multiple RF signals is downconverted to a second predetermined IF, that is, $f_{IF2}$, to produce a second IF signal, $IF_2$, and wherein the other RF signals, also downconverted to an IF, are correspondingly offset in frequency. Mixer 228 then routes the second multiple IF signals to third IF filter 230. Third IF filter 230, preferably a band pass filter centered at the second IF frequency, $f_{IF2}$, filters out-of-band signals, such as non-desired RF signals that now are offset, in frequency, from $IF_2$, and any out-of-band images generated by mixer 228, such that only the second desired RF signal, as downconverted to $f_{IF2}$, remains, that is, $IF_2$. Third IF filter 230 then routes the filtered second IF signal, that is, $IF_2$, to second IF amplifier 232, which amplifies the filtered second IF signal to produced an amplified second IF signal and routes the amplified first IF signal to fourth IF filter 234, preferably a band pass filter also centered at the second IF frequency, $f_{IF2}$. Fourth IF filter 234 filters out-of-band noise, for example, generated by amplifier 232, from the amplified second IF signal to produce a filtered amplified second IF signal and then routes the filtered amplified second IF signal to signal combiner 216. Signal combiner 216 combines the filtered amplified second IF signal with the filtered amplified first IF signal to produce a combined IF signal that is routed to a signal processing unit 240 for further processing.

Preferably, each of first RF filter 206, first IF filter 210, second IF filter 214, second RF filter 226, third IF filter 230, and fourth IF filter 234 is a band pass filter; however, one of ordinary skill in the art realizes that other filters may be used herein for one or more of filters 206, 210, 214, 226, 230, and 234, such as low pass or high pass filters or a combination thereof, that will filter out-of-band noise. Further, preferably each of first IF filter 210, second IF filter 214, third IF filter 230, and fourth IF filter 234 is a crystal filter with a narrow pass band, such as a pass band of 15 to 20 kilohertz (kHz), that passes only a desired RF signal received at antenna 114, which RF signal has been downconverted by the preceding mixer 208, 228 to the IF of the filter, that is, $f_{IF\_1}$ with respect to filters 210/214 and $f_{IF\_1}$ with respect to filters 230'234, while filtering out other RF signals received at antenna 114, which other RF signals are transmitted at frequencies different from the desired RF signal and are downconverted by the preceding mixer to IFs offset from the IF of the filter. Further, the frequency of the reference signal generated by each of reference signal sources 216 and 236 may be controlled by processor 102, thereby controlling which RF signal, of the multiple RF signals received at antenna 114, is downconverted to an IF of interest, that is, $f_{IF\_1}$ and $f_{IF\_2}$, by mixers 218 and 228, respectively, and passed by filters 210/214 or by filters 230/234.

Signal processing unit 240 preferably is implemented by processor 102 and may comprise an analog signal processing module (SPM) 242 for processing the analog signal received from combiner 216 and digitizing the analog signal and a digital signal processing module (SPM) 244 for processing the digital signal. SPM 242 translates the combined IF signal received from signal combiner 216 to baseband and digitizes the baseband signal to produce a digital version of the combined IF signal for processing by digital SPM 244. However, in another embodiment of the present invention, the IF signals output by each of first receiver path 204 and the second receiver path 224 may be separately translated to baseband and then combined, for example, using integrator delay elements and resistive combiners, and digitized.

SPM 244 then separates a baseband version of the first RF signal ($RF_1$) from a baseband version of the second RF signal ($RF_2$) for separate signal processing of each signal, thus achieving dual watch.

For example, and referring now to FIG. 3, a block diagram is provided of SPM 242 in accordance with an embodiment of the present invention. SPM 242 may include an amplifier 302 coupled to a third mixer 304, which third mixer is coupled to each of a third reference signal source 306 and an analog-to-digital converter (ADC) 308. SPM 242 routes the combined IF signal received from signal combiner 216 to amplifier 302, which amplifies the combined IF signal to produce an amplified combined IF signal and mutes the amplified combined IF signal to third mixer 304. Third mixer 304 is coupled to third reference signal source 306, preferably a voltage controlled oscillator (VCO), that provides a third reference signal at a third reference signal frequency, $f_{ref\_3}$, to third mixer 304 such that the third mixer downconverts the amplified combined IF signal received from amplifier 302 to baseband to produce a baseband version of the combined IF signal. Third mixer 304 then routes the baseband version of the combined IF signal to ADC 308, which digitizes the baseband signal to produce a digital version of the combined IF signal for processing by digital SPM 244. Thus the digital version of the combined IF signal comprises a digital version of the first RF signal, $RF_1$, downconverted from RF to IF to baseband and then digitized, and a digital version of the second RF signal, $RF_2$, also downconverted from RF to IF to baseband and then digitized.

Referring now to FIG. 4, a block diagram is provided of SPM 244 in accordance with an embodiment of the present invention. SPM 244 receives the digital version of the combined IF signal and routes the digital version of the baseband combined IF signal to each of a first digital filter 402 and a second digital filter 422, such as infinite impulse response (IIR) filters or any other appropriate filter as know in the art. First digital filter 402 passes the digital version of the first RF signal, $RF_1$, to a first signal quality metric (SQM) determination module 404 while filtering out the digital version of the second RF signal $RF_2$. Signal quality metric determination module 404 determines a signal quality metric associated with the filtered digital first RF signal $RF_1$, for example, a signal strength of the signal (for example, a received signal strength indication (RSSI), a signal-to-noise ratio (SNR), a signal-to-noise plus interference ratio (SINR), or a carrier-to-interference-plus-noise ratio (CINR), and routes the filtered digital first RF signal $RF_1$ to a first demodulator 406. Demodulator 406 demodulates the filtered digital first RF signal $RF_1$ to produce a bit stream 410 that is routed via a switching module 408 for further processing by receiver 108. In another embodiment of the present invention, signal quality metric determination module 404 may follow demodulator 406 and may determine a signal quality metric associated with the demodulated filtered digital first RF signal $RF_1$, such as a bit energy-to-noise density ratio (Eb/Io), a bit error rate, or a frame error rate.

Second digital filter 422 passes the digital version of the second RF signal $RF_2$ to a second signal quality metric (SQM) determination module 424 while filtering out the digital version of the first RF signal $RF_1$. Signal quality metric determination module 424 determines a signal quality metric associated with the filtered digital second RF signal $RF_2$, for example, a signal strength of the signal (for example, a received signal strength indication (RSSI), a signal-to-noise ratio (SNR), a signal-to-noise plus interference ratio (SINR), or a carrier-to-interference-plus-noise ratio (CINR), and routes the filtered digital second RF signal $RF_2$ to a second demodulator 426. Demodulator 426 demodulates the filtered digital second RF signal $RF_2$ to produce a bit stream 430 that is routed via a switching module 428 for further processing by receiver 108. In another embodiment of the present invention, signal quality metric determination module 424 may follow demodulator 426 and may determines a signal quality metric associated with the demodulated signal, such as a bit energy-to-noise density ratio (Eb/Io), a bit error rate, or a frame error rate.

In the prior art, when operating in single watch mode, a communication device, and in particular an RF receiver of the communication device, receives and processes a received signal over only a single receiver path, such as first receiver path 204 or second receiver path 224, disabling the other receiver path. However, instances may arise where single watch mode reception is poor due to obstructions and/or a noisy environment and the receiver of the communication device is operating close to the receiver's sensitivity. It may be critical, in such situations, that the communication device not lose contact with the public safety communication system. In order to provide for improved signal reception when operating in single watch mode under poor operating conditions, communication device 100, and in particular Receiver 108, processes a same received signal over both receiver paths, that is, over both first receiver path 204 and second receiver path 224, when receiver performance is poor. By processing a same received signal over both receiver paths and then combining the signal processed by each path in the signal processing module, receiver sensitivity is enhanced and receiver performance is improved.

More particularly, when operating in single watch mode, communication device 100, and in particular signal processing unit 240, determines a signal quality metric associated with an RF signal via which the receiver currently is receiving user traffic. Based on the signal quality metric, communication device 100 then determines whether to process a received signal via a single receiver path, such as first receiver path 204, or via multiple parallel receiver paths, such as first receiver path 204 and second receiver path 224, when operating in single watch mode.

Figure 5A:
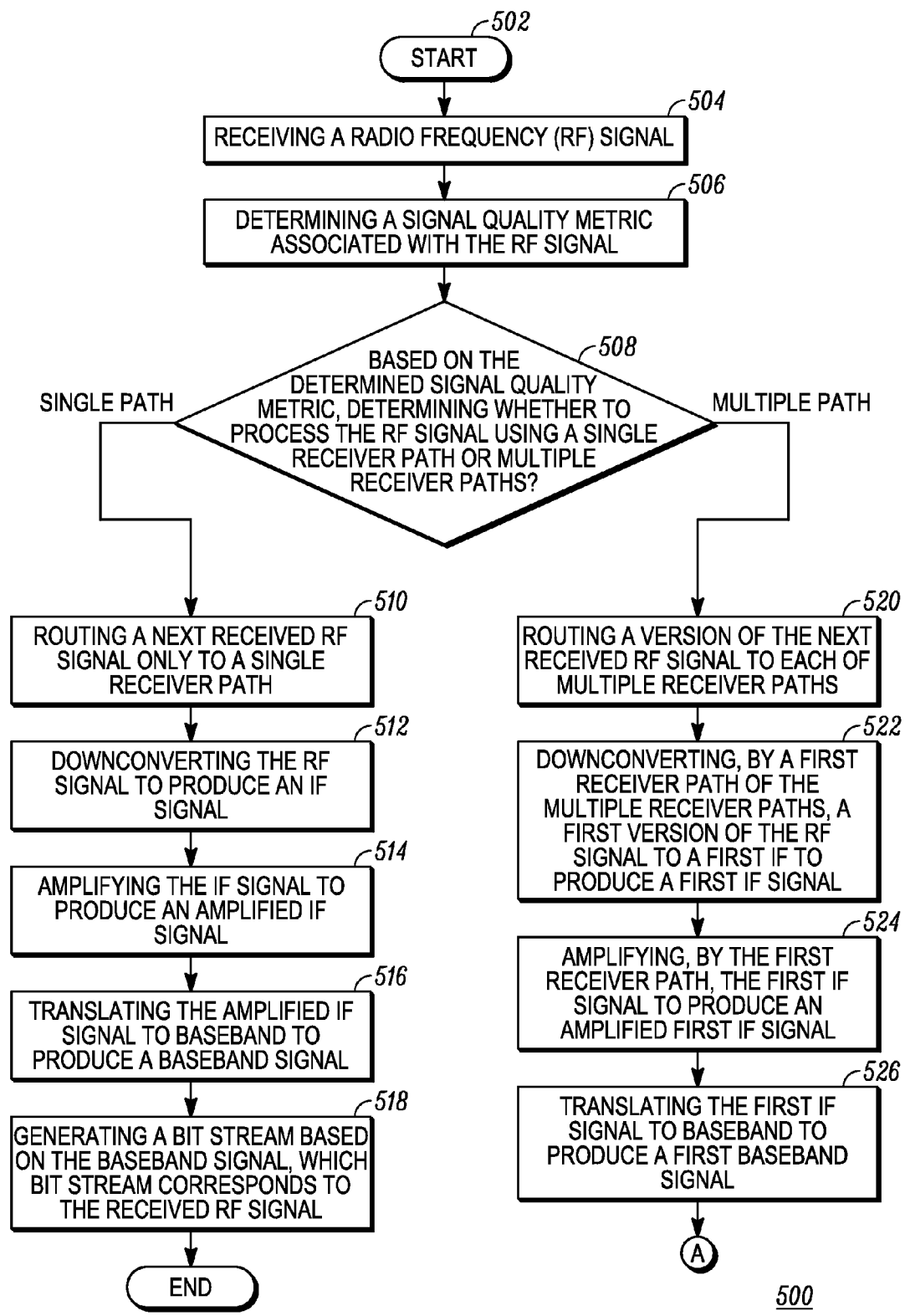
FIG. 5A is a logic flow diagram illustrating a single watch mode scheme of operation executed by the wireless communication device of FIG. 1 in accordance with an embodiment of the present invention.
Figure 5B:
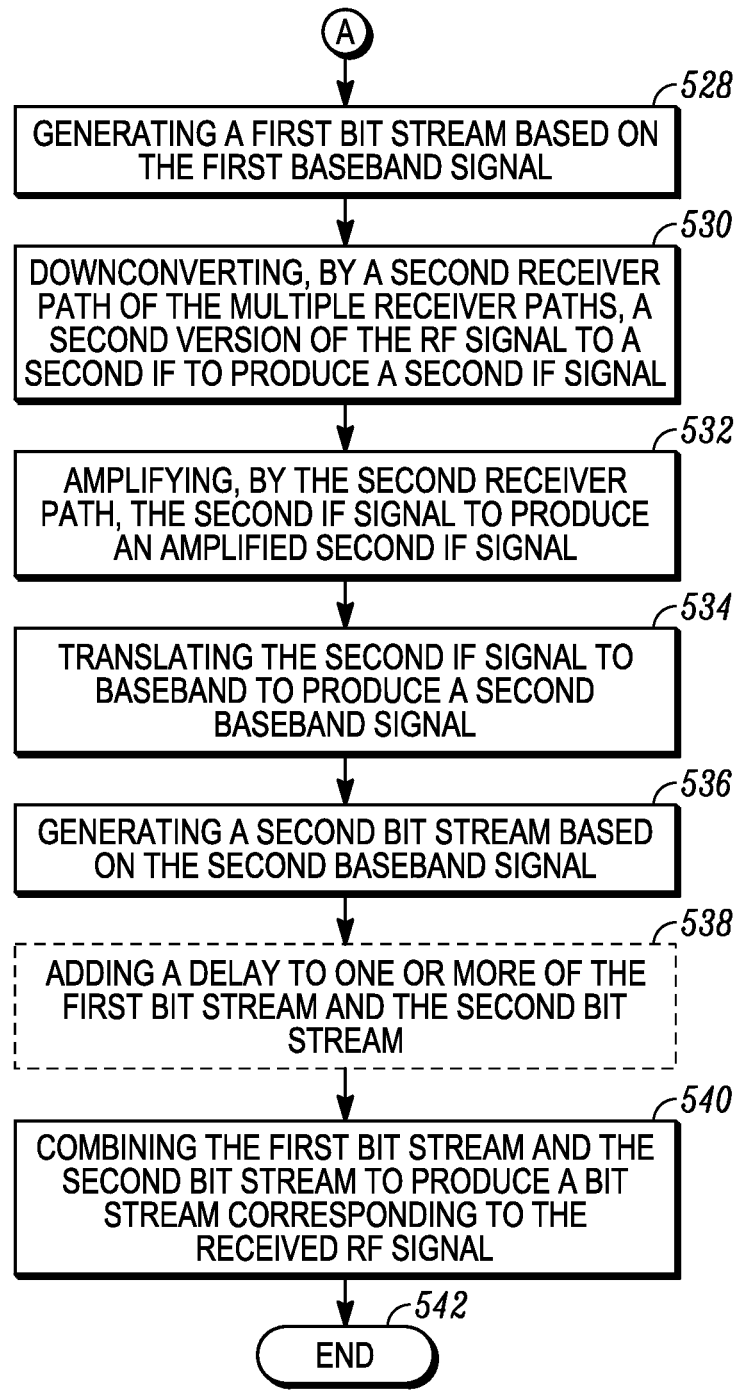
FIG. 5B is a continuation of the logic flow diagram of FIG. 5A illustrating a single watch mode scheme of operation executed by the wireless communication device of FIG. 1 in accordance with an embodiment of the present invention.

Referring now to FIGS. 5A and 5B, a logic flow diagram 500 is provided that illustrates a single watch mode scheme of operation of communication device 100 in accordance with an embodiment of the present invention. Logic flow diagram 500 begins (502) when communication device 100, and in particular receiver 108, receives (504), via antenna 114, an RF signal, thereby producing a received RF signal. Receiver 108 then determines (506) a signal quality metric associated with the received RF signal and, based on the determined signal quality metric, determines (508) whether to process a received RF signal via a single receiver path, such as first receiver path 204, or via multiple parallel receiver paths, such as first receiver path 204 and second receiver path 224.

More particularly, receiver 108 routes a received RF signal to LNA 202. LNA 202 amplifies the received RF signal to produce an amplified RF signal and routes the amplified RF signal only to a single receiver path, for example, to first receiver path 204. First receiver path 204 routes the amplified RF signal to mixer 208 via filter 206, and mixer 208 downconverts the amplified RF signal to the first IF, $f_{IF1}$, to produce an IF signal. Mixer 208 then routes the IF signal to IF amplifier 212 via filter 210, and IF amplifier 212 amplifies the IF signal to produce an amplified IF signal that then is routed to signal processing unit 240 via filter 214 and combiner 216.

Signal processing unit 240, and in particular SPM 242, translates the amplified IF signal to baseband and digitizes the baseband signal to produce a digital version of the amplified IF signal, and more particularly of the received RF signal. Signal processing unit 240, and in particular SPM 244, then routes the digital signal to signal quality metric (SQM) determination module 404 via filter 402, and signal quality metric determination module 404 determines a signal quality metric associated with the digital signal, for example, a signal strength of the signal (for example, a received signal strength indication (RSSI), a signal-to-noise ratio (SNR), a signal-to-noise plus interference ratio (SINR), or a carrier-to-interference-plus-noise ratio (CINR). As noted above, in another embodiment of the present invention, signal quality metric determination module 404 may follow demodulator 406 and may determine a signal quality metric associated with the demodulated signal, such as a bit energy-to-noise density ratio (Eb/Io), a bit error rate, or a frame error rate.

Based on the determined signal quality metric, receiver 108, and in particular signal processing unit 240, the determines whether to continue to process a received RF signal via only a single receiver path, that is, first receiver path 204, or to process received RF signals via multiple parallel receiver paths, such as first receiver path 204 and second receiver path 224, when operating in single watch mode.

In an embodiment of the present invention, in making the determination of whether to process a received RF signal via only a single receiver path or multiple parallel receiver paths when operating in single watch mode, signal processing unit 240 may compare the signal quality metric, determined with respect to a received RF signal, to a signal quality metric threshold that is maintained by the at least one memory device 104. When the determined signal quality metric compares favorably to the signal quality metric threshold, for example, when a signal strength of the received signal is greater than a received signal strength threshold, or a measured SNR/SINR/CINR associated with the received signal is greater than a corresponding SNR/SINR/CINR threshold, or a bit error rate or frame error rate is less than a bit error rate or frame error rate threshold, then signal processing unit 240 determines to continue to process received RF signals via a single receiver path, that is, first receiver path 204. However, when determined signal quality metric compares unfavorably to the signal quality metric threshold, for example, when the signal strength of the received signal is less than the received signal strength threshold, or the measured SNR/SINR/CINR associated with the received signal is less than the corresponding SNR/SINR/CINR threshold, or the bit error rate or frame error rate is greater than the bit error rate or frame error rate threshold, then signal processing unit 240 determines to process received RF signals via multiple parallel receiver paths, such as first receiver path 204 and second receiver path 224.

In response to determining (508) to process a received RF signal via a single receiver path receiver 108 routes (510) a next received RF signal only to a single receiver path, for example, first receiver path 204. First receiver path 204 then downconverts (512) the RF signal to an IF to produce an IF signal and amplifies (514) the IF signal to produce an amplified IF signal. Signal processing unit 240 translates (516) the amplified IF signal to baseband to produce a baseband version of the received RF signal and generates (518) a bit stream based on the baseband signal and that corresponds to the received RF signal, for example, digitizing and demodulating the baseband signal to produce the bit stream for further processing. Logic flow 500 then ends (542).

That is, in the single receiver path embodiment, receiver 108 routes a next received RF signal, received via antenna 114, to LNA 202. LNA 202 amplifies the received RF signal to produce an amplified RF signal and routes the amplified RF signal only to a single receiver path, for example, to first receiver path 204. First receiver path 204 mutes the amplified RF signal to mixer 208 via filter 206, and mixer 208 downconverts the amplified RF signal to a first IF ($f_{IF1}$) to produce an IF signal. Mixer 208 then routes the IF signal to IF amplifier 212 via filter 210, and IF amplifier 212 amplifies the IF signal to produced an amplified IF signal that then is routed to signal processing unit 240 via filter 214 and combiner 216. Signal processing unit 240, for example, SPM 242, translates the amplified IF signal to baseband and digitizes the baseband signal to produce a digital version of the amplified IF signal, which digital signal is a digital version of the received RF signal. Signal processing unit 240, for example, SPM 244, then routes the digital signal to demodulator 406, for example, via signal quality metric determination module 404 and filter 402, and demodulator 406 demodulates the digitized baseband signal to produce a bit stream 410 that is routed via switching module 408 for further processing by receiver 108.

On the other hand, in response to determining (508) to process a received signal via a multiple receiver paths, receiver 108 routes (520) a next received RF signal to each of multiple receiver paths, for example, routes a first version of the RF signal to first receiver path 204 and mutes a second version of the RF signal to second receiver path 224. First receiver path 204 then downconverts (522) the first version of the RF signal to a first IF to produce a first IF signal and amplifies (524) the first IF signal to produce an amplified first IF signal. Second receiver path 224 downconverts (530) the second version of the RF signal to a second IF (different from the first IF) to produce a second IF signal and amplifies (532) the second IF signal to produce an amplified second IF signal.

Signal processing unit 240 translates (526) the amplified first IF signal to baseband to produce a first baseband version of the received RF signal, and generates (528) a first bit stream based on the baseband signal and that corresponds to the received RF signal, for example, by digitizing and demodulating the first baseband signal to produce the first bit stream. Signal processing unit 240 further translates (534) the amplified second IF signal to baseband to produce a second baseband version of the received RF signal, and generates (536) a second bit stream based on the second baseband signal and that also corresponds to the received RF signal, for example, by digitizing and demodulating the second baseband signal to produce a second bit stream. Signal processing unit 240 may add (538) a delay to one of more of the first bit stream and second bit stream, and then signal processing unit 240 combines (540) the first and second bit streams to produce a bit stream corresponding to the received RF signal and for further processing. Logic flow 500 then ends (542).

That is, in the multiple receiver path embodiment, receiver 108 routes a next received RF signal, received via antenna 114, to LNA 202. LNA 202 amplifies the received RF signal to produce an amplified RF signal and routes a version of the amplified RF signal to each of multiple receiver paths, for example, routes a first version of the amplified RF signal to first receiver path 204 and routes a second version of the amplified RF signal to second receiver path 224.

First receiver path 204 routes the first version of the amplified RF signal to mixer 208 via filter 206, and mixer 208 downconverts the first version of the amplified RF signal to the first IF ($f_{IF1}$) to produce a first IF signal. Mixer 208 then routes the first IF signal to IF amplifier 212 via filter 210, and IF amplifier 212 amplifies the first IF signal to produced an amplified first IF signal that then is routed to signal processing unit 240 via filter 214 and combiner 216.

Similarly, second receiver path 224 routes the second version of the amplified RF signal to mixer 228 via filter 226, and mixer 228 downconverts the second version of the amplified RF signal to the second IF ($f_{IF2}$, different from $f_{IF1}$) to produce a second IF signal. Mixer 228 then routes the second IF signal to IF amplifier 232 via filter 230, and IF amplifier 232 amplifies the second IF signal to produced an amplified first IF signal that then is routed to signal processing unit 240 via filter 234 and combiner 236.

Signal processing unit 240, for example, SPM 242, translates the amplified first IF signal to baseband to produce a first baseband signal and digitizes the first baseband signal to produce a first digital signal. Signal processing unit 240, for example, SPM 244, routes the first digital signal to demodulator 406, for example, via signal quality metric determination module 404 and filter 402, and demodulator 406 demodulates the first digital signal to produce a first bit stream 412 that is routed via switching module 408 to a first gain adjuster 414 of SPM 244. Gain adjuster 414 adjusts a gain of the first bit stream 412 and, optionally, may add a first delay to the first bit stream. Gain adjuster 414 then routes the gain adjusted (and delayed) first bit stream to a combiner 440.

Further, signal processing unit 240, for example, SPM 242, translates the amplified second IF signal to baseband to produce a second baseband signal and digitizes the second baseband signal to produce a second digital signal. Signal processing unit 240, for example, SPM 244, then routes the second digital signal to demodulator 426, for example, via signal quality metric determination module 424 and filter 422, and demodulator 426 demodulates the second digital signal to produce a second bit stream 432 that is routed via switching module 428 to a second gain adjuster 434 of SPM 244. Gain adjuster 434 adjusts a gain of the second bit stream 432 and, optionally, may add a second delay to the second bit stream. Gain adjuster 434 then routes the gain adjusted (and delayed) second bit stream to combiner 440. Combiner 440 then combines the first bit stream and the second bit stream to produce a bit stream 442 corresponding to the received RF signal for further processing by processor 102.

The gain adjustments and delays added to the first and second bit steams are designed so that the first and second bit steams may be optimally and synchronously combined at combiner 440. However, in other embodiments of the present invention, the gain adjusters 414, 434 may be dispensed with, only one gain adjuster 414, 434 may be employed, or only one of gain adjuster 414 and gain adjuster 434 may add a delay to the bit stream received by the gain adjuster, again so that that the first and second bit steams are synchronously combined at combiner 440.

Experiments have shown that by processing a same received RF signal through separate receive paths, and then combining them in a signal processing unit, communication device 100 achieves a net improvement in signal to noise performance of a receiver. The only correlated noise source in the two receiver paths 204 and 224 is LNA 202. Subsequent to the LNA, the noise sources in the two receiver paths are independent and uncorrelated, and therefore do not add in the same way, thus giving improved signal to noise performance as detected at the signal processing unit.

By providing a dual watch receiver that, when operating in a single watch mode, receives a radio frequency (RF) signal, determines a signal quality metric associated with a received RF signal, and based on the determined signal quality metric, determines whether to route a same RF signal to only a first receiver path or to both of the first receiver path and a second receiver path, wherein the first receiver path and second receiver path process a received RF signal in parallel, a quality of a received signal may be improved when the dual watch receiver is operating close to the receiver's sensitivity, for example, in emergency situations where public safety personnel, such as a firefighter, may be inside of a building where reception is poor due to obstructions and/or a noisy environment. On the other hand, when operating in a single watch mode and operating conditions are good, the receiver continues to utilize only a single receiver path, thereby minimizing power consumption and extending battery life.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus that the element.

What is claimed is:

1. A radio frequency (RF) receiver capable of operating in both a dual watch mode and a single watch mode, the RF receiver comprising:
   a low noise amplifier (LNA) that is configured to amplify a received RF signal;
   a first receiver path coupled to the LNA, wherein the first receiver path comprises a first mixer that is configured to downconvert an RF signal received from the LNA to a first intermediate frequency (IF) to produce a first IF signal;
   a second receiver path coupled to the LNA, wherein the second receiver path comprises a second mixer that is configured to downconvert an RF signal received from the LNA to a second IF to produce a second IF signal, wherein the second IF is different from the first IF, and wherein the first receiver path and second receiver path process a received RF signal in parallel;
   a processor coupled to each of the first receiver path and the second receiver path, wherein the processor is configured to, when operating in single watch mode:
      determine a signal quality metric associated with a received RF signal; and
      based on the determined signal quality metric, determine whether to route an amplified version of a same RF signal to only one of the first receiver path and the second receiver path or to route amplified versions of a same RF signal to both the first receiver path and the second receiver path; and
   in response to determining to route amplified versions of a same RF signal to both the first receiver path and the second receiver path, route amplified versions of the same RF signal to both the first receiver path and the second receiver path and combine outputs of the first receiver path and the second receiver path;
   wherein the first receiver path is configured to downconvert an amplified version the RF signal to a first intermediate frequency (IF) to produce a first IF signal;
   wherein the second receiver path is configured to downconvert another amplified version the RF signal to a second IF to produce a second IF signal, wherein the first IF is different than the second IF; and
   wherein the processor is configured to translate the first IF signal to baseband to produce a first baseband signal, generate a first bit stream based on the first baseband signal, translate the second IF signal to baseband to produce a second baseband signal, generate a second bit stream based on the second baseband signal, and combine the first bit stream and the second bit stream; and wherein the processor is configured to, prior to combining the first bit stream and the second bit stream, add a delay to one or more of the first bit stream and the second bit stream.

2. The radio frequency (RF) receiver of claim 1, wherein the processor is configured to determine whether to route a same RF signal to only one of the first receiver path and the second receiver path or to both of the first receiver path and the second receiver path by comparing the signal quality metric to a signal quality metric threshold and, if the signal quality metric compares unfavorably to the signal quality metric threshold, arrange to route an amplified version of a same RF signal to both of the first receiver path and the second receiver path.

3. The radio frequency (RF) receiver of claim 1, wherein the processor is configured to determine whether to route a same RF signal to each of the first receiver path and the second receiver path by comparing the signal quality metric to a signal quality metric threshold and, if the signal quality metric compares favorably to the signal quality metric threshold, arrange to route an amplified version of a same RF signal only to only one of the first receiver path and the second receiver path.

4. The radio frequency (RF) receiver of claim 1, wherein determining a signal quality metric comprises determining one of more of a signal strength of the signal, a signal-to-noise ratio, a signal-to-noise plus interference ratio, or a carrier-to-interference-plus-noise ratio, a bit energy-to-noise density ratio (Eb/Io), a bit error rate, and a frame error rate.

5. The radio frequency (RF) receiver of claim 1, wherein determining to route an amplified version of a same RF signal to only one of the first receiver path and the second receiver path comprises routing the amplified version of the RF signal to only the first receiver path and not the second receiver path, wherein the first receiver path is configured to downconvert the RF signal to an intermediate frequency (IF) to produce an IF signal, and wherein the processor is configured to translate the IF signal to baseband to produce a baseband signal and to generate a bit stream based on the baseband signal.

6. A method for receiving a radio frequency (RF) signal by a dual watch receiver when operating in a single watch mode, the method comprising:
   determining a signal quality metric associated with a received RF signal;
   based on the determined signal quality metric, determining whether to route a same RF signal to only a first receiver path or to both of the first receiver path and a second receiver path, wherein the first receiver path and second receiver path process a received RF signal in parallel; and
   when operating in a single watch mode and in response to determining to route amplified versions of a same radio frequency (RF) signal to both the first receiver path and the second receiver path, routing amplified versions of the same RF signal to both the first receiver path and the second receiver path; and
   combining outputs of the first receiver path and the second receiver path;
   downconverting, by the first receiver path, an amplified version the radio frequency (RF) signal to a first intermediate frequency (IF) to produce a first IF signal;
   translating the first IF signal to baseband to produce a first baseband signal;
   generating a first bit stream based on the first baseband signal;
   downconverting, by the second receiver path, another amplified version the RF signal to a second IF to produce a second IF signal, wherein the first IF is different than the second IF
   translating the second IF signal to baseband to produce a second baseband signal;
   generating a second bit stream based on the second baseband signal; and
   combining the first bit stream and the second bit stream; and
   prior to combining the first bit stream and the second bit stream, adding a delay to one or more of the first bit stream and the second bit stream.

7. The method of claim 6, wherein determining whether to route a same radio frequency (RF) signal to each of the first receiver path and the second receiver path comprises:
   comparing the signal quality metric to a signal quality metric threshold; and
   if the signal quality metric compares unfavorably to the signal quality metric threshold, arranging to route an amplified version of a same RF signal to each of the first receiver path and the second receiver path.

8. The method of claim 6, wherein determining whether to route a same radio frequency (RF) signal to each of the first receiver path and the second receiver path comprises:
   comparing the signal quality metric to a signal quality metric threshold; and
   if the signal quality metric compares favorably to the signal quality metric threshold, arranging to route an amplified version of a same RF signal only to the first receiver path and not to the second receiver path.

9. The method of claim 6, wherein determining a signal quality metric comprises determining one of more of a signal strength of the signal, a signal-to-noise ratio, a signal-to-noise plus interference ratio, or a carrier-to-interference-plus-noise ratio, a bit energy-to-noise density ratio (Eb/Io), a bit error rate, and a frame error rate.

10. The method of claim 6, wherein determining to route an amplified version of a same RF signal to only one of the first receiver path and the second receiver path comprises routing the amplified version of the radio frequency (RF) signal only to the first receiver path and not to the second receiver path, and wherein the method further comprises:
    downconverting the RF signal to an intermediate frequency (IF) to produce an IF signal;
    translating the IF signal to baseband to produce a baseband signal; and
    generating a bit stream based on the baseband signal.

11. A wireless communication device comprising:
    a radio frequency (RF) transmitter;
    a dual watch RF receiver comprising:
      a low noise amplifier (LNA) that is configured to amplify a received RF signal;
      a first receiver path coupled to the LNA, wherein the first receiver path comprises a first mixer that is configured to downconvert an RF signal received from the LNA to a first intermediate frequency (IF) to produce a first IF signal;
      a second receiver path coupled to the LNA, wherein the second receiver path comprises a second mixer that is configured to downconvert an RF signal received from the LNA to a second IF to produce a second IF signal, wherein the second IF is different from the first IF, and wherein the first receiver path and second receiver path process a received RF signal in parallel;

a processor coupled to each of the first receiver path and the second receiver path, wherein the processor is configured to, when operating in single watch mode:
  determine a signal quality metric associated with a received RF signal; and
  based on the determined signal quality metric, determine whether to route an amplified version of a same RF signal to only one of the first receiver path and the second receiver path or to route amplified versions of a same RF signal to both the first receiver path and the second receiver path; and
in response to determining to route amplified versions of a same RF signal to both the first receiver path and the second receiver path, route amplified versions of the same RF signal to both the first receiver path and the second receiver path and combine outputs of the first receiver path and the second receiver path;
wherein the first receiver path is configured to downconvert an amplified version the RF signal to a first intermediate frequency (IF) to produce a first IF signal;

wherein the second receiver path is configured to downconvert another amplified version the RF signal to a second IF to produce a second IF signal, wherein the first IF is different than the second IF and wherein the processor is configured to translate the first IF signal to baseband to produce a first baseband signal, generate a first bit stream based on the first baseband signal, translate the second IF signal to baseband to produce a second baseband signal, generate a second bit stream based on the second baseband signal, and combine the first bit stream and the second bit stream; and wherein the processor is configured to, prior to combining the first bit stream and the second bit stream, add a delay to one or more of the first bit stream and the second bit stream.

12. The communication device of claim 11, wherein the communication device is a land mobile radio.

* * * * *